United States Patent [11] 3,626,142

| [72] | Inventor | James R. King |
| | | Tustin, Calif. |
| [21] | Appl. No. | 33,685 |
| [22] | Filed | May 1, 1970 |
| [45] | Patented | Dec. 7, 1971 |
| [73] | Assignee | Union Carbide Corporation |
| | | New York, N.Y. |

[54] ELECTRON BEAM MACHINE
2 Claims, 11 Drawing Figs.

[52] U.S. Cl. ..................................................... 219/121 EB,
219/72
[51] Int. Cl. ............................................................ B23k 15/00
[50] Field of Search ............................................. 219/72, 74,
121, 121 EB, 126

[56] References Cited
UNITED STATES PATENTS

| 2,459,812 | 1/1949 | Griffiths | 219/74 |
| 2,866,078 | 12/1958 | Ballentine et al. | 219/126 |
| 2,950,378 | 8/1960 | Tuthill | 219/74 |
| 3,136,883 | 6/1964 | Radtke | 219/121 |
| 3,435,185 | 3/1969 | Gerard | 219/121 |

*Primary Examiner*—R. F. Staubly
*Assistant Examiner*—Robert O'Neill
*Attorneys*—Paul A. Rose, Harrie M. Humphreys and Dominic J. Terminello ABSTRACT: An electron beam machine wherein the electron gun is housed in a gun chamber separate from the vacuum chamber housing the work. A moveable seal is maintained around the gun and between the gun chamber and the vacuum chamber.

PATENTED DEC 7 1971

3,626,142

INVENTOR.
JAMES R. KING

BY Dominic J. Ferraiuolo

ATTORNEY

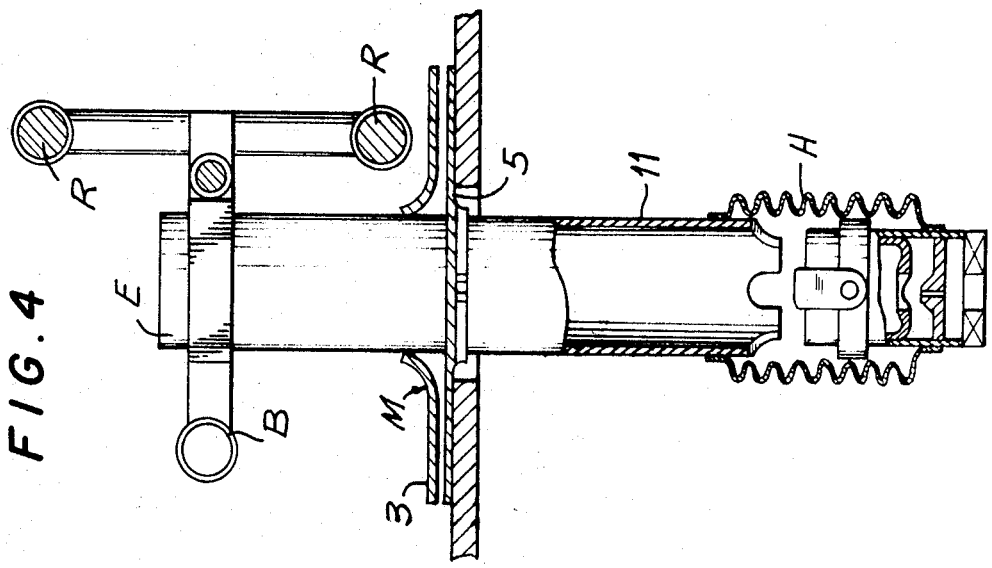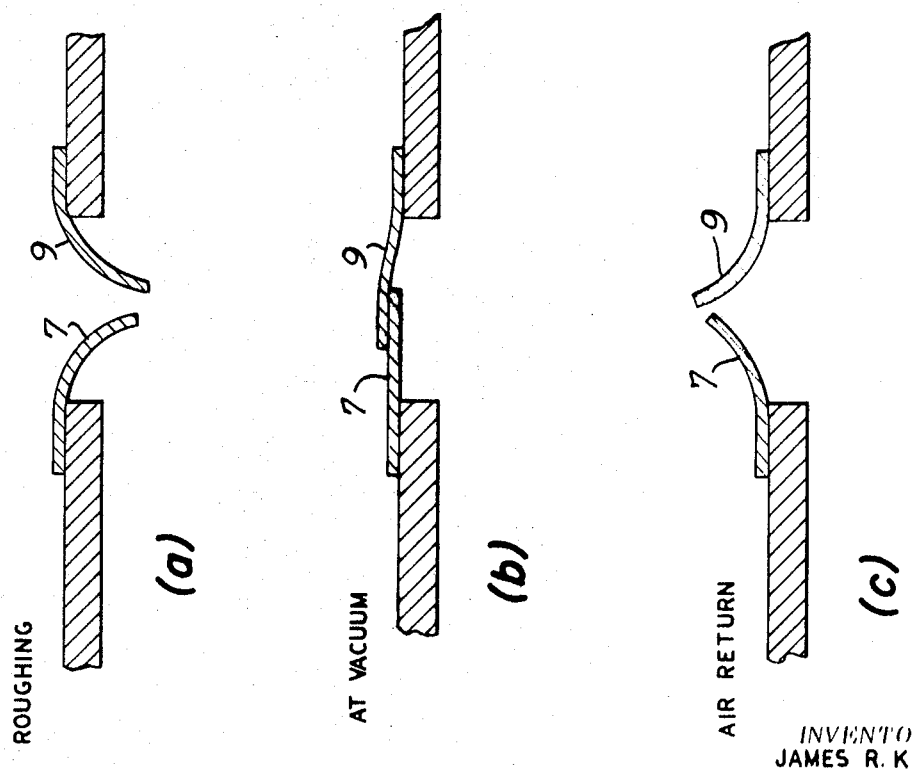

FIG. 5
(a)
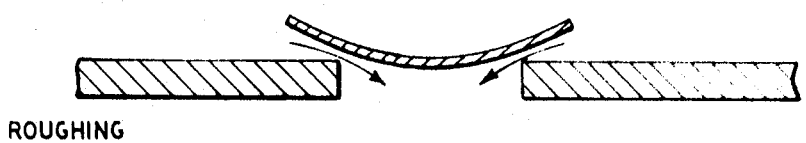
ROUGHING
(b)
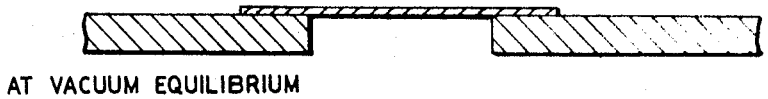
AT VACUUM EQUILIBRIUM
(c)
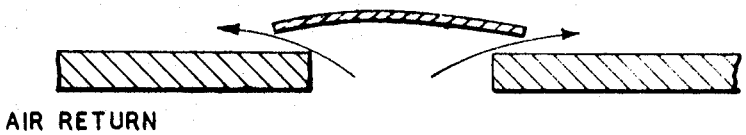
AIR RETURN PATENTED DEC 7 1971
3,626,142
SHEET 4 OF 4
FIG.6
(a)
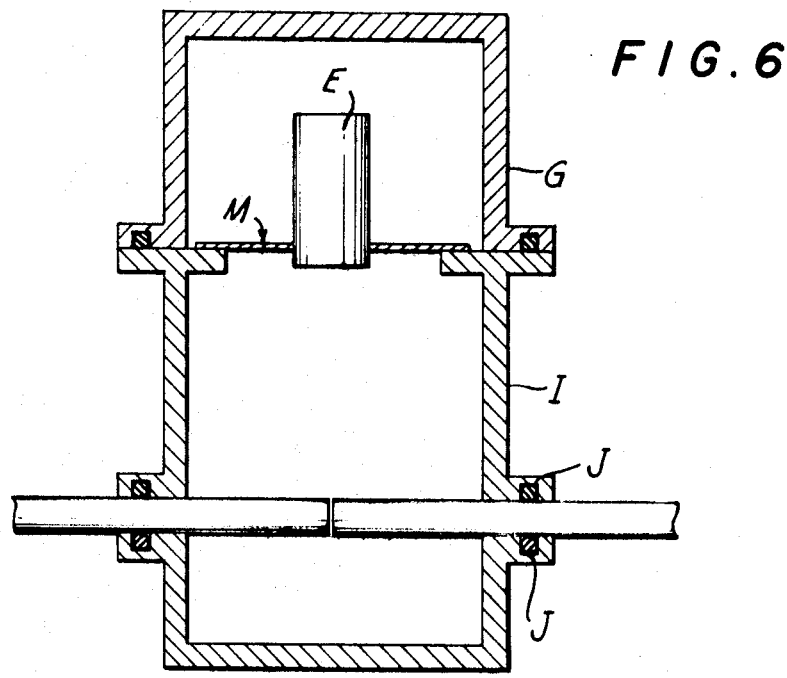
(b)
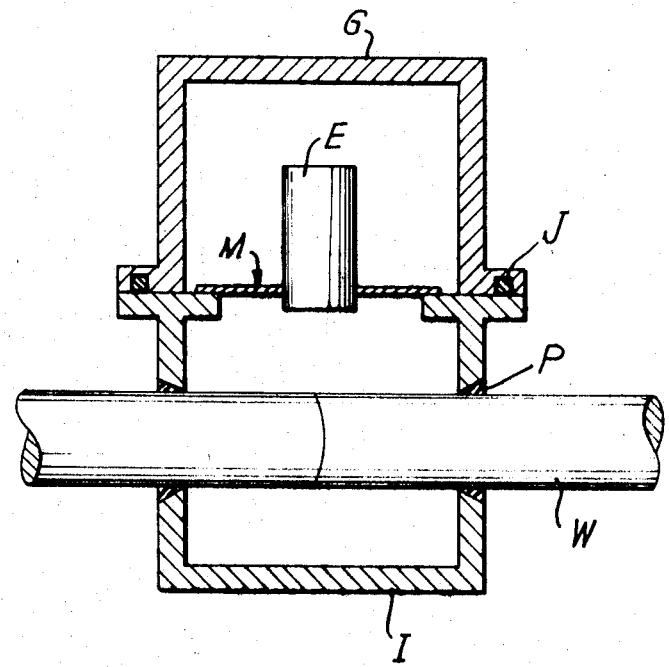
INVENTOR.
JAMES R. KING
BY *Dominic J....*
ATTORNEY

ELECTRON BEAM MACHINE

This invention relates to an electron beam machine, and more particularly, to a novel chamber arrangement for such machines.

Of prime concern in any electron beam machine is maximum utilization of chamber area. This, of course, is true because the electron beam process is a vacuum process and requires that the chamber housing the gun be pumped down to some desired vacuum pressure. Pumping down is time consuming and costly and, therefore, it is desirable to avoid excess volume and area in the main chamber.

Up until now, the useable space in a given size chamber of an electron beam machine has been limited by the size of the work table in the chamber and/or the size of the electron gun and associated mechanism when the gun is mounted within the chamber.

It is the main object of this invention to provide a novel electron beam machine wherein maximum utilization of the main chamber volume and area is achieved.

Another object is to provide an electron beam machine wherein pump down requirements are minimized.

A further object is to provide an electron beam machine which facilitates welding in all positions.

These, and other objects, will be pointed out or become apparent from the following description and drawings wherein.

Figure 1:
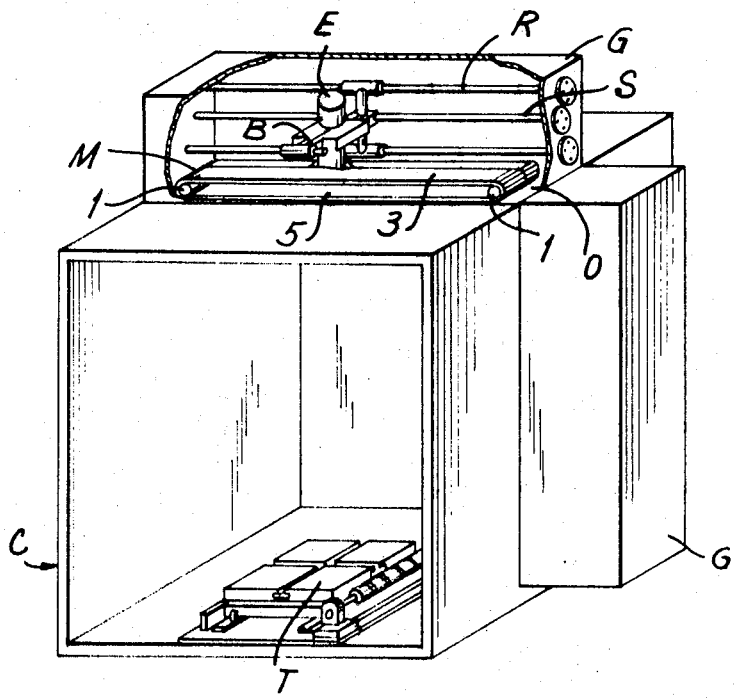
FIG. 1 is a perspective view of an embodiment of the invention.

FIG. 3a, b and c are cross section views showing the position of the flexible barrier and having a continuous center slit under various pressure conditions;

FIG. 4 is a front elevation, partially in cross section, showing an extension added to the electron beam gun;

FIG. 5a, b and c are cross section views showing the position of the spring roller type of flexible barrier having free floating sides under various pressure conditions;

FIG. 6a and b are front elevation views partially in cross section showing the manner in which the gun chamber and flexible barrier are used in combination as a clamp-on chamber mounted to a workpiece or intermediate chamber.

The apparatus of the invention takes advantage of the benefit of having an electron gun that is separately housed and separately pumped, and at the same time provides a greater working area and working volume within the main chamber than does any other prior art apparatus without solely relying upon long electromagnetic focal distances.

Briefly stated, the invention provides an electron beam machine having a vacuum chamber with an opening in at least one wall. In the vacuum chamber is mounted a moveable worktable. Mounted on the vacuum chamber is an electron beam gun chamber which has an opening of similar size and shape as the opening in the wall of the vacuum chamber. The openings are in registry so as to provide communication between the vacuum chamber and the gun chamber. Mounted between the vacuum chamber and the gun chamber, and in the openings, providing communication between said chambers is a flexible member forming a flexible barrier to low-pressure gases between said chambers. Mounted in the electron beam gun chamber is an electron beam gun which extends through the flexible barrier and into the vacuum chamber. Provided around the front end of the gun is a low-pressure seal, moveable with the gun, to maintain pressure isolation of said gun chamber from said vacuum chamber when gas pressures on both sides of the barrier are in the intermediate or fractional microns of mercury range.

The flexible barrier also serves to protect the gun and its mechanisms from welding vapor and weld splatter.

In order to permit gas flow into and out of the gun chamber and to provide a semisealed condition when the pressures on either side of the barrier approximate equilibrium, a variety of valving techniques could be employed. For example, the barrier itself can be used for valving. When the barrier has a continuous center slit the action is as shown in FIG. 3a, b and c.

When the barrier is unbroken over its extensity, but has free edges, the valving action is shown in FIG. 5a, b and c.

When the barrier is unbroken over its extensity and restrained at its edges, the valving may be by means of slits or flaps which would also have a similar action as that shown in FIG. 3a, b and c.

One or multiple slits may be used over a range of sizes such that the lips of the slit have sufficient stiffness to return to a semiclosed position under conditions of near pressure equilibrium. Such slits may or may not have overlapping lips as in most cases abutting lips or even lips with minute openings may be satisfactory.

While while prior art devices have used separately housed guns in some cases and moveable guns inside the welding chamber in other cases, no one up until now has developed an electron beam welding machine which has a separately housed moveable gun utilizing a flexible low-pressure barrier. One major advantage of such a machine is that large work chambers do not have to be pumped down to the vacuum required by the electron beam gun itself, thereby providing a definite savings in the size and cost of vacuum pumping equipment. Another advantage of the present invention is that it provides increased chamber utilization to permit smaller chambers for a given size workpiece.

One of the important considerations of this invention is that mechanical vacuum pumps and diffusion vacuum pumps are properly assigned to regions of maximum utilization. As can be seen from the following discussion, mechanical pumps are best applied to the work processing chamber, whereas diffusion pumps are used to pump the gun chambers where they experience the best of operating conditions.

Vacuum pumping of gases is divided into two fairly well defined regions: Pumping in the viscous flow (high-density gas) region, and pumping in the molecular flow (low-density gas) region. The different characteristics of these two types of flow are reflected in the types of vacuum pumps used to evacuate an enclosure. Mechanical pumps have fairly high pumping rates in the viscous region, the limit of which is approximately 1 micron of mercury. A more practical operating point to be reached in a reasonable time might be 5 microns, although actual figures depend upon the size of the pumps, size of chamber, materials, etc.

In the molecular flow region, diffusion pumps are commonly used backed in series by mechanical pumps wherein the diffusion pump serves as a precompressor to return the rarified gas to dense or viscous flow gas to greater than the 5 micron level so that it can be exhausted by a mechanical pump.

Mechanical pumps are simply on or off devices which begin operation at atmospheric pressure. Diffusion pumps, on the other hand, cannot be exposed to pressures, even briefly, above 100 microns. They must be heated up, maintained at temperature, cooled down and valved off to protect their hot oil. The mechanical mounting of large diffusion pumps is difficult. Piping and valving is large, cumbersome, and expensive.

As the mechanical pumps are used to pump viscous air, it is commonly considered that they pump the volume of gas from the chamber, and pumping calculations for a static system for these pumps are usually made on this basis.

As the pressure approaches 5 microns, and as the gas movement tends to molecular flow, the release of gases that had been adhering to the chamber walls become the predominate consideration. Therefore, in a static system the diffusion pump calculations for pumping time are based on the total surface area of the chamber and its contents.

All pumping times are first calculated on a clean, dry, empty chamber. However, these times vary gases, a chamber has been used in processing work such as metallizing, vapor deposition, welding, etc. The chamber walls accumulate coatings of various types which are porous and which trap grass, water vapor, etc. These gases are released each time the chamber is returned to low pressure.

It can be seen that mechanical pumps usually see exactly the same gas load from the volume of the chamber for each pumpdown, and the addition of the usual piecepart acts to decrease the volume. Therefore, it is found, in a practical sense, that mechanical pumping time varies but little over the life of the equipment, barring malfunctions and leaks of course.

Diffusion pumping as a practical experience has many ramifications. As the chamber accumulates a porous coating, outgassing becomes apparent in the region below 5 microns, and pumping time grows progressively longer. Minor contaminations such as shop dust, airborne oil vapor and increased humidity all act to increase the pumping time of the diffusion pump, or the pump itself may slow down as its own oil becomes contaminated.

Whereas the introduction of a piecepart into the chamber decreases the volume seen by the mechanical pump, it greatly increases the area seen by the diffusion pump, and again diffusion pumping time is increased. The combination of the above problems eventually increases the pumping time beyond tolerance, and the system must frequently be torn down and cleaned.

Therefore, obvious benefits accrue by dividing a chamber system into two parts such that the processing or contaminating portion is pumped by mechanical pumps to a pressure that is not sensitive to normal outgassing. The sensitive regions of the system that must be pumped to a pressure below 5 microns by diffusion pumps, are protected from contamination due to their separation and the intervening barrier. In this way, the diffusion pumping time of the protected region remains more nearly the same over its life. Of course by restricting the portion of the entire system to be diffusion-pumped initially, the required pumping capacity of the diffusion pumps is reduced.

An overall view of the prior art situation regarding the utilization of vacuum chambers is given by considering the manner in which prior art devices make uses of the three degrees of freedom, i.e., X, Y, and Z axes.

When the gun is mounted internally in the work chamber, it usually moves along one axis, for example, the Y axis and the table provides movement along another axis, X. Movement of the table can only be about one half of the X axis distance because of the size of the table and associated mechanism. Thus, the cross-sectional area utilized in this type of machine is approximately one half the cross-sectional area of the chamber. In the Z or vertical direction, the space lost is that taken up by the gun and height of work table.

When the gun is fixed and mounted outside the main chamber, there is less loss of space in the Z direction because the gun is not in the chamber, but movement on both the X and Y direction must be achieved by table movement which, again, is limited to about one half of the X and Y distance. Thus, the useable area is about one quarter the cross-sectional area of the chamber and does not usually permit movement on the Z axis.

Providing a moveable gun outside the main work chamber combines the advantages of both of the above systems, thus resulting in maximum utilization of chamber space.

The invention and its attendant advantages are predicated on the provision of a moveable gun mounted in a separate chamber isolated from the main chamber by a flexible barrier. Both the gun chamber and the main chamber remain fixed, one relative to the other with only the gun moving.

Figure 2:
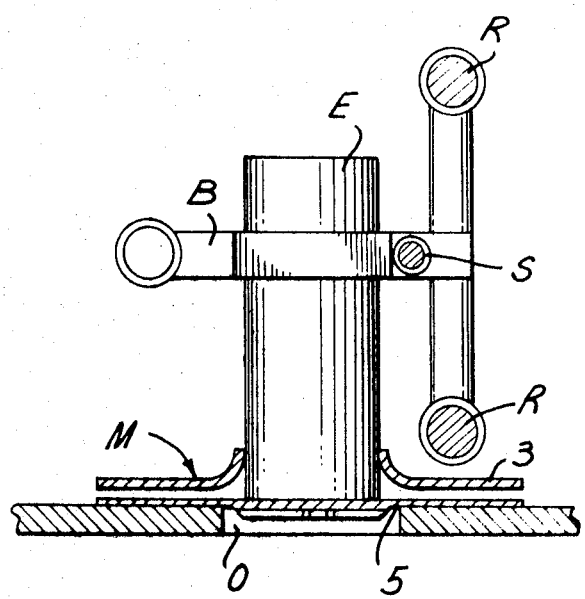
FIG. 2 is a side elevation view of the electron beam gun mounted in the apparatus.

Referring now to the drawings, and particularly FIGS. 1 and 2, the main or welding chamber is shown generally at C. Mounted in the chamber C is a work table T provided with appropriate rails and gears for movement on one axis. Mounted on top of the chamber C is the gun chamber G. Mounted in the chamber G is electron gun E which is moveable on rails R by buggy B, driven by ball nut and screw S. The gun chamber G and main chamber C communicate through opening O in chamber C. If desired, a second opening may be provided in a vertical wall of the chamber C for mounting the gun chamber G in the vertical position. Provided between chamber C and G is a flexible barrier member shown generally at M. The member M is guided by roller members 1, rotatable mounted in chamber G. The member M is a split continuous belt which has an upper section 3 and a lower section 5. The upper section 1 has an overlapping section 7 and 9, (See FIGS, 3a, b and c) forming a slit therein permitting the gun E to move through the upper section as the gun is moved in chamber G. The member is attached to the gun and is moved along the with gun motion. The lower section 5 has a hole therein for receiving the front end of the gun E and is sealed around gun E to provide a low-pressure seal between the work chamber C and the gun chamber G. It will be observed that this sealing arrangement permits movement of gun E in chamber G while isolating the gun chamber G from the main chamber C, thus permitting the vacuum in chamber G to be maintained at, for example, about 0.1 micron pressure while the main chamber may be maintained at a somewhat greater pressure, for example, 5 microns or higher. The seal itself need not be perfect. Small leak paths may exist because the pressure differential against which we are offering a sealing barrier is slight or negligible.

The gun chamber G may be used as a clamp on the chamber to be affixed to a large piecepart which serves as one wall of a vacuum enclosure or with a second clamp on chamber intermediately placed between the gun chamber and a workpiece as shown in FIG. 6a and b. In FIG. 6a and b the general parts similar to those in FIGS. 1 and 2 bear similar reference characters. In such an operation the intermediate chamber I is pumped by its own vacuum pumps while the gun chamber G carries its own pumps and flexible barrier. In this case the barrier M serves for pressure separation and also to protect the gun E and its mechanisms from weld vapor and weld splatter when operated in close proximity to the weld. The gun chamber G attaches to the work W (See 6b) or an intermediate chamber I (See 6a) and is made pressure tight against atmosphere by a static O-ring (or similar) seal between the two members, represented at J in FIG. 6a and at P in FIG. 6b.

The pressure differential over which the barrier operates is relative and can function at higher and lower pressures where the size of the leaks around the barrier are small compared to the mean free path of the gas molecules at ambient temperature and the selected pressures. The effectiveness of the system is limited only by the pumping capacity of the pumps on either side of the barrier.

The system functions because at the pressure levels considered gas molecules move from one region to another in a random manner by bouncing off the walls. The direction of these "bounces" are statistically random because of the roughness of the walls on an atomic scale. There will nevertheless be a net movement of gas from a region of higher density (pressure) to one of lower density simply because the region of higher density has more molecules. Conversely, if there is a net movement or "flow" between the two regions a pressure gradient must exist (no matter how small). The "flow" of gas s occurs according to the equation $Q=(P_2-P_1) C$. Where Q is the quantity of gas flow and $P_2-P_1$ is the pressure gradient across the barrier and C denotes the conductance of the leaks between the two regions. $P_2$ and $P_1$ are, of course, determined by the respective pumping systems on either side of the barrier.

In operation, the member M and, particularly, its upper section 3 functions as shown in FIGS. 3a, b and c at different pressure conditions. In FIG. 3a, when the roughing pumps are evacuating the main chamber C, the overlapping sections 7 and 9 will be in the positions shown, permitting rough evacuation of the gun chamber. When vacuum conditions are reached, the overlapping sections 7 and 9 will be in their normal position, as shown in FIG. 3b. When the welding operation is completed and air is returned to the machine, the sections 7 and 9 will be in the position shown in FIG. 3c, thereby permitting air to flow from the main chamber C into gun chamber G. When vacuum conditions are reached, as shown in FIG. 3b, and the weld is ready to be made, the gun E will extend through the upper section 3 and the lower section 5 at the opening O in chamber C. As the gun E is moved, the barrier M will move with the gun, and the seal in the lower section 5 will be maintained around the gun E. In the upper section 3, the overlapping sections 7 and 9 will part, permitting the gun E to pass therebetween because the upper section 5 will be moving in a direction opposite to the direction of travel of the gun E and lower section 5.

The above-described flexible barrier arrangement functions in a similar way, even when it becomes desirable or necessary to place an extension 11, (See FIG. 4) on the gun E to vary the distance of the gun from the work in the vertical or Z direction. In the embodiment shown in FIG. 4, like parts bear like reference characters to the parts shown in FIG. 1 through 3c. In this embodiment, an extension 11 of desired length is provided on gun E. Also provided between the gun E and extension 11 may be placed below B which acts to maintain the vacuum within the gun E while at the same time permitting angular positioning of the gun axis.

A second system shown in FIG. 5 (which functions to the same end as the aforedescirbed split, endless belt) makes use of two independent spring-loaded rollers to which flexible members are attached. The free ends of these flexible members are attached and sealed to a collar surrounding the gun housing or an extension member. Thus, as the gun moves to the right the flexible barrier on the left is unwound from its roller and the flexible barrier on the right is taken up by its own spring-driven roller.

These rollers could be motor-driven for long flexible barriers or they could be slaved together by a chain linkage. Other obvious systems might employ counterbalance weights or other techniques to obtain the same end of automatically rolling or unrolling the flexible barrier.

The flexible barrier itself might take the form of semirigid metal spring material on either side of the gun or extension which is self winding by its own inherent spring action.

The gun E referred to in this application may be any electron beam generating device, but is preferably of the type described in my copending application, Ser. No. 33,578, and filed May 1, 1970.

Briefly, that gun incorporates a pilot gun of the plasma or cold cathode type wherein electrons are obtained from a gaseous medium. The so-generated pilot beam is then focused on a main cathode or emitter which provides the electron for the main beam. In guns of this type, the main electron beam is usually generated in a hard vacuum of, for example, about 0.1 microns.

Having described my invention with reference to certain preferred embodiments, it should be understood that minor modification, as to the construction of parts of the arrangement thereof may be made without departing from the spirit and scope of the invention.

What is claimed is:

1. An electron beam machine comprising:
   a vacuum chamber having an opening in at least one wall thereof;
   a movable worktable mounted in said chamber;
   an electron beam gun chamber having an opening of similar size and shape as the opening in the wall of said vacuum chamber, mounted on said vacuum chamber such that said access openings register with each other;
   a flexible barrier member mounted between said vacuum chamber and said gun chamber to form a flexible seal therebetween;
   an electron beam gun mounted in said gun chamber and extending through said flexible member; and means for moving said gun in said gun chamber;
   a pressure seal around the portion of said gun extending through said flexible member to maintain pressure isolation of said gun chamber from said vacuum chamber which seal moves with the gun as the gun is moved.

2. A clamp-on electron beam machine which can be attached in turn to a number of variety of intermediate chamber or pieceparts comprising;
   a vacuum chamber housing an electron beam gun; means for moving said gun in said chamber and a vacuum pumping system, said chamber having an opening in one side opposite the gun and normal to the gun axis;
   a static seal around said opening which will permit the gun chamber to seal directly to a workpiece or to an intermediate chamber;
   a flexible barrier member mounted to close off the opening in the gun chamber through which a portion of said gun may penetrate; and a pressure seal around said gun and moveable therewith.

* * * * *